(12) United States Patent
Almalki

(10) Patent No.: US 8,514,880 B2
(45) Date of Patent: Aug. 20, 2013

(54) FEATURE ADAPTABLE NT CARD

(75) Inventor: Safa Almalki, Nepean (CA)

(73) Assignee: Alcatel Lucent, Paris (FR)

( * ) Notice: Subject to any disclaimer, the term of this patent is extended or adjusted under 35 U.S.C. 154(b) by 791 days.

(21) Appl. No.: 12/141,432

(22) Filed: Jun. 18, 2008

(65) Prior Publication Data

US 2009/0316717 A1    Dec. 24, 2009

(51) Int. Cl.
*H04L 12/66*        (2006.01)

(52) U.S. Cl.
USPC ........................................................ 370/463

(58) Field of Classification Search
USPC ........................................................ 370/463
See application file for complete search history.

(56) References Cited

U.S. PATENT DOCUMENTS

| | | | |
|---|---|---|---|
| 6,954,463 B1 * | 10/2005 | Ma et al. ....................... | 370/401 |
| 2002/0018470 A1 * | 2/2002 | Galicki et al. ................ | 370/392 |
| 2002/0103921 A1 * | 8/2002 | Nair et al. ..................... | 709/232 |
| 2002/0105967 A1 * | 8/2002 | Chen ............................. | 370/465 |
| 2007/0053292 A1 * | 3/2007 | DePaul et al. ................. | 370/235 |
| 2007/0211642 A1 * | 9/2007 | Franzke et al. ............... | 370/250 |

* cited by examiner

*Primary Examiner* — Jason Mattis
*Assistant Examiner* — Stephen J Clawson
(74) *Attorney, Agent, or Firm* — Marks & Clerk

(57) ABSTRACT

A network termination card is provided which allows new services to be implemented on the DSLAM on which the network termination card is located without restricting the number of slots used for line termination cards. Software controlled multiplexers are provided on some ports of the switch on the network termination card, and a daughter card connector is provided on the network termination card. When a new service is to be implemented, a specialized daughter card implementing the service can be connected to the daughter card connector. The multiplexers can then be configured to allow the necessary number of ports from the switch to communicate with the daughter card connector, while other multiplexers can be configured to retain communication between the switch and normal components of the DLSAM. The invention allows flexibility in which and how many ports of the switch are used to communicate with the daughter card, thereby allowing a new service to be implemented via the DLSAM without limiting communication between the switch and other regular components beyond what is necessary.

16 Claims, 2 Drawing Sheets

FEATURE ADAPTABLE NT CARD

FIELD OF THE INVENTION

This invention relates to network termination cards on DSLAMs.

BACKGROUND OF THE INVENTION

An Internet Protocol-Digital Subscriber Line Access Multiplexer (IP-DSLAM) shelf typically includes one or two Line Termination cards and a single Network Termination card placed into respective slots on the shelf. Each Line Termination card includes a number of ports, each port serving a user. Each Line Termination card connects to the Network Termination card, which in turn establishes communications between the Line Termination cards and the aggregation network.

An example IP-DSLAM is the 7330™, part of the Intelligent Services Access Manager (ISAM™) family of products by Alcatel-Lucent. This IP-DSLAM has four slots for Line Termination (LT) cards and a Network Termination (NT) card. The Network Termination card includes a 24-port GE switch. The GE switch is connected to each of four Line Termination cards through four of the ports of the GE switch, one port per Line Termination card. Four ports connect the GE switch to an IP network through the faceplate of the NT card. The remaining sixteen ports of the GE switch connect to a GE Expander Unit, through which each of the sixteen ports connects to the network, to a remote unit, or, often, to nothing and the port is not used. Each Line Termination card has 48 ports and can therefore support up to 48 users. The entire IP-DSLAM shelf can therefore support up to 192 users.

As new services are implemented within communication networks, such as video-on-demand (VOD), there is a temptation to implement the service on the ISAM rather than in the network, so as to reduce the communications and associated provisioning between the IP-DSLAM and the network. For example, in the case of VOD, content could be stored on the IP-DSLAM rather than on a server within the IP network. One solution would be to build the functionality of the new service into the Network Termination card. However, this is not very customizable and would require a new Network Termination card to be designed or built every time a new service was introduced.

A more flexible solution is to build the function into one of the slots normally used for one of the Line Termination cards by using a specialized service card. This would allow a new service to be easily added to the IP-DSLAM without changing the Network Termination card, which is typically the most complex and expensive component on an IP-DSLAM. However, using one of the slots normally used for a Line Termination card obviously reduces the number of possible Line Termination cards and hence the number of users which can be supported by the IP-DSLAM. Although the new service could be added relatively easily, the per-user cost of the IP-DSLAM would increase. In addition, the bandwidth available between a port normally supporting a Line Termination card and the GE switch is limited to 1 Gb/s, which may be insufficient for some services.

A flexible solution for adding a service to an IP-DLSAM without using one of the slots normally used for a Line Termination card would allow services to be easily added without the need to replace the Network Termination card each time a service was added or changed, and would not reduce the number of users which can be supported by the IP-DSLAM.

SUMMARY OF THE INVENTION

According to one aspect, the invention provides for a network termination (NT) card. The NT card includes a switch and a daughter card connector. The NT card also includes a software-controlled multiplexer on each of a number of ports of the switch. One channel of each multiplexer leads to the daughter card connector. In one embodiment, a second channel of at least one of the multiplexers leads to a network to which the switch provides communication. Each multiplexer may be individually controlled to allow communication either between the switch and the daughter card connector or between the switch and another component to which a second channel of the multiplexer leads.

According to another aspect the invention provides for a DSLAM. The DSLAM includes a network termination card having a switch, a daughter card connector, and software-controlled multiplexers on each of a number of ports of the switch. One channel of each multiplexer leads to the daughter card connector. The DSLAM also includes one or more line termination cards, and a daughter card within the daughter card connector. The daughter card provides a service in communication with a network with which the switch provides communication. Each multiplexer may be individually controlled to allow communication either between the switch and the daughter card or between the switch and another component to which a second channel of the multiplexer leads.

The invention allows a service to be added to an IP-DSLAM without the need to customize the hardware on the Network Termination card. By placing a daughter card connector on the Network Termination card, a new service can be installed in the IP-DSLAM on a new daughter card. The daughter card connector is interfaced to the GE switch by means of software controlled multiplexers. The design allows a single variant of the Network Termination card to support a range of user selected services, without restricting the number of Line Termination cards and the number of supported users.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
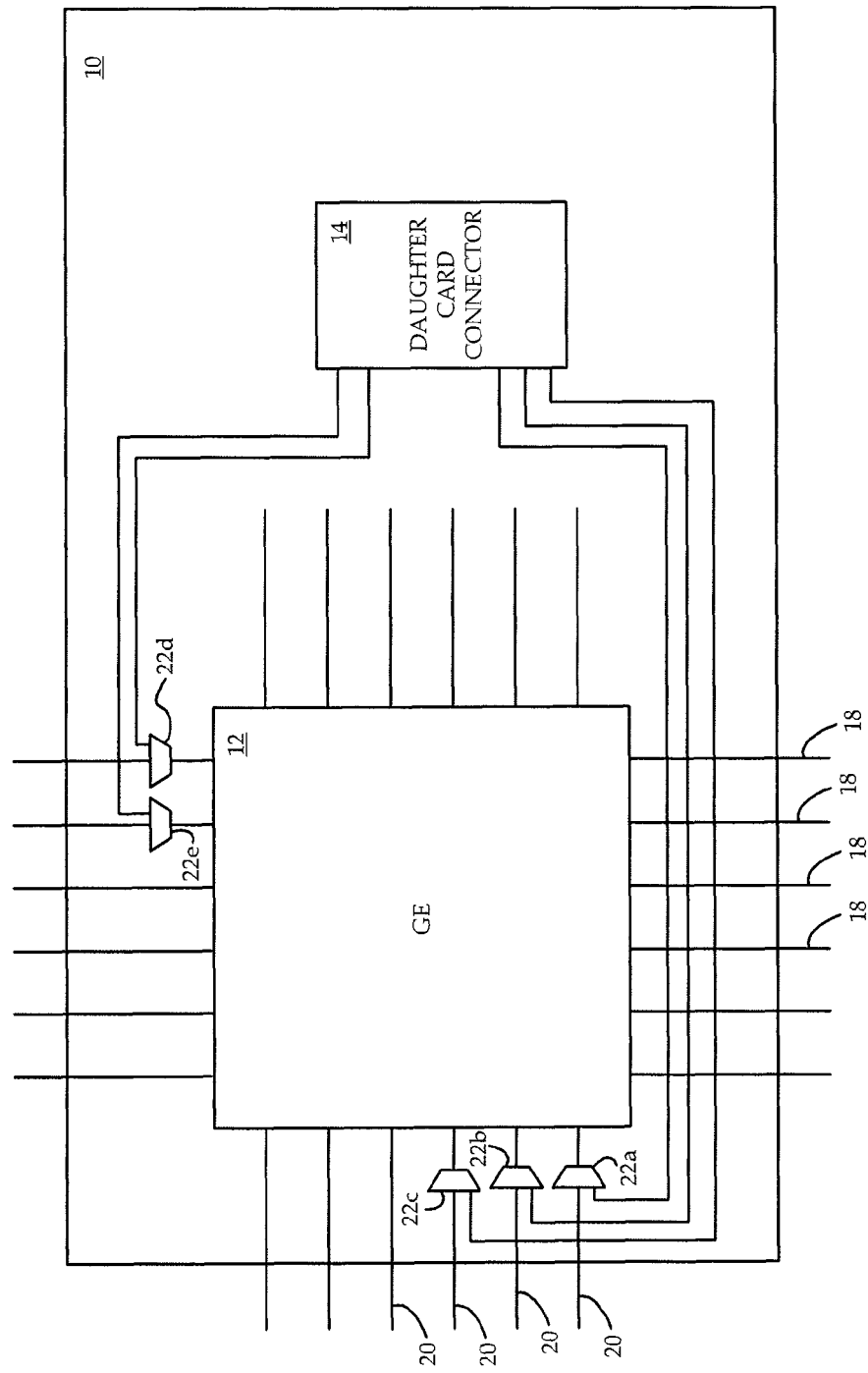
FIG. 1 is a schematic diagram of a Network Termination card according to one embodiment of the invention.

Referring to FIG. 1, a schematic diagram of a Network Termination (NT) card according to one embodiment of the invention is shown. The NT card 10 includes a GE switch 12, and a daughter card connector 14. The GE switch 12 includes twenty-four ports. When the NT card 10 is placed in an IP-DSLAM, four ports 18 lead to Line Termination (LT) cards. The IP-DLSAM connects users to an IP network through four ports 20 which interface with the IP network through the faceplate of the NT card. The remaining ports lead to a GE Expander Card (not shown) and thence to network ports, to remote LT cards, to some other device, or remain unused.

The leads from five of the ports, three of which lead to the IP network through the faceplate and two of which lead to the GE Expander Card, include software controlled multiplexers 22(a-e). Each multiplexer 22 can transmit data on and receive data from one of two channels. One channel of each multiplexer 22 communicates with the usual components of an IP-DSLAM and IP network, such as the LT cards or IP network interfaces, although the first channel of some multiplexers may remain unused if the port on which the multiplexer is located is normally unused. The second channel of the multiplexers 22a-e communicates with the daughter card connector 14. Each multiplexer 22 is configured by software running on the CPU (not shown) of the NT card to communicate over one of the two channels.

If a new service is to be provided by the IP-DSLAM, the new service communicating with the network with which the switch 12 provides communication, a daughter card (not shown) containing logic (either hardware or a combination of hardware and software) for providing the service is connected to the daughter card connector 14. One, some, or all of the multiplexers 22 are then configured by software to communicate with the daughter card connector 14. The number of multiplexers 22 to configure and the choice of which multiplexers 22 to configure will depend on the needs of the daughter card and on the number of remote LT cards or network ports to remain in service. For example, if the new service requires 2 Gb/s of communication through the IP-DSLAM, then the multiplexers 22d and 22e could be set to communicate with the daughter card connector 14. If the new service required 3 Gb/s of communication through the IP-DSLAM, then the multiplexer 22c could also be set to communication with the daughter card connector 14, although only three of the ports 20 connected to the IP network through the faceplate would then actually be in communication with the IP network.

The Network Termination card of FIG. 1 is only an example configuration. The multiplexers 22 may be on different port connections, different numbers of ports may have multiplexers leading to the daughter card connector, different number of ports may lead to the network and to LT cards, and switches other than a GE switch with 24 ports may be used. In general, any switch and any arrangement of multiplexers may be used, as long as there is a daughter card connector able to communicate with the switch through some shared ports using multiplexers to select communication between the switch and either the daughter card connector or other components of the DSLAM or of a communication network.

Figure 2:
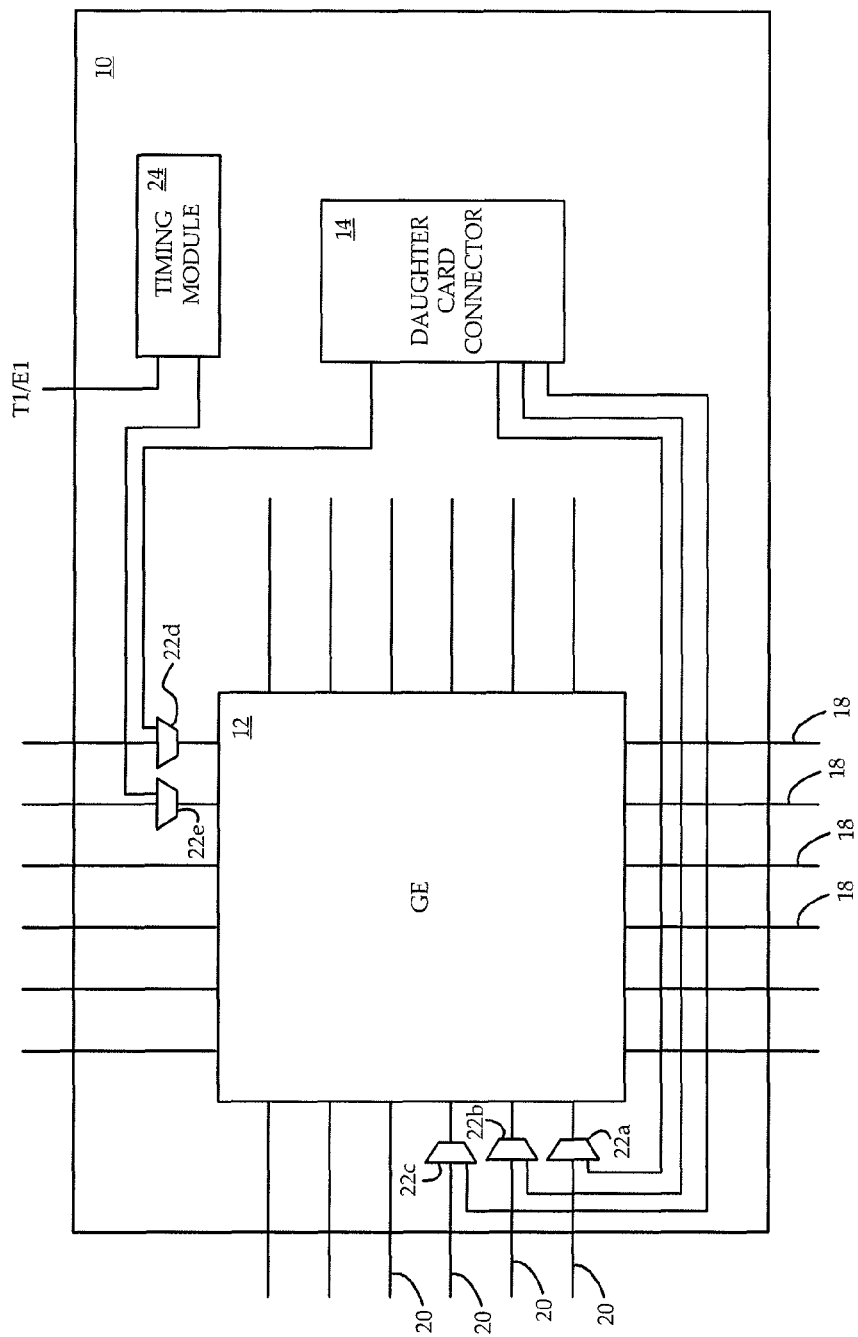
FIG. 2 is a schematic diagram of a Network Termination card according to another embodiment of the invention.

Referring to FIG. 2, a schematic diagram of an NT card according to another embodiment of the invention is shown. In this embodiment, the NT card includes a timing module connector 24. The timing module connector 24 allows a synchronization subsystem to be inserted onto the NT card. The second channel of one of the multiplexers 22e leads to the timing module connector 24 rather than to the daughter card connector 14. While this means fewer ports are available for communication with the daughter card connector 14, the arrangement allows for clock synchronization between the daughter card and the GE switch 12, for example using the IEEE 1588 protocol. The timing module connector includes a T1/E1 connection which allows the timing module to extract an external clock from a packet network and act as an IEEE 1588 master, providing synchronization with other nodes within the network.

The embodiments presented are exemplary only and persons skilled in the art would appreciate that variations to the embodiments described above may be made without departing from the spirit of the invention. The scope of the invention is solely defined by the appended claims.

I claim:

1. A network termination card comprising:
   a daughter card connector;
   a switch; and
   a plurality of software-controlled multiplexers, one on each of a plurality of ports of the switch, a first connection of each multiplexer leading to the daughter card connector and a second connection of each multiplexer leading to another component corresponding to the port on which the multiplexer is located, wherein the configuration of each multiplexer can be individually controlled to allow communication either between the switch and the daughter card connector or between the switch and the corresponding other component so as to change the number of ports which communicate with only the daughter card connector.

2. The network termination card of claim 1 wherein the second connection of at least one of the multiplexers leads to a network to which the switch provides communication.

3. The network termination card of claim 1 wherein the switch is a Giga-Ethernet switch.

4. The network termination card of claim 3 wherein the second connection of at least one of the multiplexers leads to a Giga-Ethernet Expander Card.

5. The network termination card of claim 3 wherein the second connection of at least one of the multiplexers leads to an IP network through a faceplate of a DSLAM on which the network termination card is located.

6. The network termination card of claim 5 wherein the second connection of at least one of the multiplexers leads to a Giga-Ethernet Expander Card.

7. The network termination card of claim 2 wherein the switch provides communication between the network and at least one line termination card.

8. The network termination card of claim 1 further comprising a timing module connector and another multiplexer on another port of the switch, and wherein a first connection of the other multiplexer leads to the timing module connector and a second connection of the other multiplexer leads to a component different from the timing module connector.

9. A Digital Subscriber Line Access Multiplexer (DSLAM) comprising:
   a network termination card comprising:
      a daughter card connector;
      a switch; and
      a plurality of software-controlled multiplexers, one on each of a plurality of ports of the switch, a first connection of each multiplexer leading to the daughter card connector and a second connection of each multiplexer leading to another component corresponding to the port on which the multiplexer is located, wherein the configuration of each multiplexer can be individually controlled to allow communication either between the switch and the daughter card connector or between the switch and the corresponding other component so as to change the number of ports which communicate with only the daughter card connector;
   at least one line termination card; and a daughter card inserted in the daughter card connector, the daughter card providing a service which communicates with a network to which the switch provides communication.

10. The DSLAM of claim 9 wherein the second connection of at least one of the multiplexers leads to the network.

11. The DLSAM of claim 9 wherein the switch is a Giga-Ethernet switch.

12. The DSLAM of claim 11 wherein the second connection of at least one of the multiplexers leads to a Giga-Ethernet Expander Card.

13. The DSLAM of claim 11 wherein the second connection of at least one of the multiplexers leads to an IP network through a faceplate of the DSLAM.

14. The DSLAM of claim 13 wherein the second of at least one of the multiplexers leads to a Giga-Ethernet Expander Card.

15. The DSLAM of claim 9 further comprising:
a timing module connector on the network termination card; and
an additional software-controlled multiplexer on another port of the switch, the additional software-controlled multiplexer having a first connection leading to the timing module connector and a second connection leading to a component different from the timing module connector.

16. The DSLAM of claim 15 further comprising a synchronization subsystem inserted in the timing module connector.

* * * * *